(12) United States Patent
Nagasawa

(10) Patent No.: US 9,580,006 B2
(45) Date of Patent: Feb. 28, 2017

(54) VEHICLE HEADLIGHT DEVICE

(71) Applicant: Fuji Jukogyo Kabushiki Kaisha, Tokyo (JP)

(72) Inventor: Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/868,494

(22) Filed: Sep. 29, 2015

(65) Prior Publication Data
US 2016/0090024 A1    Mar. 31, 2016

(30) Foreign Application Priority Data

Sep. 30, 2014  (JP) .................................. 2014-200692

(51) Int. Cl.
*B60Q 1/02*       (2006.01)
*B60Q 1/14*       (2006.01)

(52) U.S. Cl.
CPC .......... *B60Q 1/143* (2013.01); *B60Q 2300/11* (2013.01); *B60Q 2300/14* (2013.01); *B60Q 2300/45* (2013.01)

(58) Field of Classification Search
None
See application file for complete search history.

(56) References Cited

U.S. PATENT DOCUMENTS

| 5,798,911 A * | 8/1998 | Josic .................. B60Q 1/085 362/286 |
| 6,293,686 B1 | 9/2001 | Hayami et al. |
| 2001/0028565 A1 | 10/2001 | Ishida |
| 2005/0141232 A1* | 6/2005 | Chon .................. B60Q 1/1415 362/509 |

FOREIGN PATENT DOCUMENTS

| JP | 54022630 A | 2/1979 |
| JP | 2000-238576 A | 9/2000 |
| JP | 2001-270383 A | 10/2001 |
| JP | 2009282564 A * | 10/2001 |
| JP | 2006-501627 T | 1/2006 |
| JP | 2009-282564 A | 3/2009 |
| JP | 2014-008913 A | 1/2014 |

OTHER PUBLICATIONS

Japanese Office Action Issued in Japanese Patent Application No. 2014-200692 filed on Feb. 2, 2016.

* cited by examiner

*Primary Examiner* — Anh Tran
(74) *Attorney, Agent, or Firm* — Troutman Sanders LLP

(57) ABSTRACT

A vehicle headlight device includes optical systems that are respectively provided to light sources, and illuminate ahead of a vehicle by light emitted from the light sources, with light distribution patterns of which illuminating areas are offset to each other at least in vertical directions, a stoppable distance calculator that calculates a stoppable distance of the vehicle, and a light source controller that controls the light sources to be turned on and off so that an area ahead of the vehicle and away from the vehicle by the stoppable distance is illuminated by at least one of the optical systems.

4 Claims, 3 Drawing Sheets

VEHICLE HEADLIGHT DEVICE

CROSS-REFERENCE TO RELATED APPLICATION

The present application claims priority from Japanese Patent Application No. 2014-200692 filed on Sep. 30, 2014, the entire contents of which are hereby incorporated by reference.

BACKGROUND

1. Technical Field

The present disclosure relates to a vehicle headlight device mounted to a vehicle etc., and particularly to the vehicle headlight device which can suitably illuminate an area within which the vehicle is stoppable, with a simple configuration.

2. Related Art

Headlight devices mounted to vehicles, such as automobiles, are typically configured to be provided with a plurality of lighting systems having different light distribution characteristics (e.g., different illuminating areas), for example, caused by high beam (driving beam) headlights and low beam (passing beam) headlights, of which light sources are selectively turned on and off according to a traveling state of the vehicles. Recently, Adaptive Front-lighting System (AFS) that automatically changes the illuminating area, for example, according to the traveling state of the vehicles has been proposed. For example, Japanese Unexamined Patent Application Publication (JP-A) No. 2014-008913 discloses a headlight device that reduces a glare to oncoming automobile(s), pedestrian(s), etc. by changing the intensity and angle of the illumination according to a traveling speed of the vehicles.

As disclosed in JP-A No. 2014-008913, only an area within which the vehicle is stoppable can be illuminated by changing the angle of illumination according to the traveling speed of the vehicle. Thus, it can be prevented to induce a vehicle operator's unnecessary gaze caused by illuminating even an area unnecessary for a determination the vehicle, and to increase a burden of the vehicle operator. However, if at least some of the light sources and optical systems are configured to be movable so that their optical axes are pivotable at least in vertical directions, and the illuminating area is changed by actuators which drive the light sources and optical systems, the configuration of the headlight device becomes complicated, and weight and costs increase.

SUMMARY OF THE INVENTION

One purpose of the present disclosure is made in view of the situations described above, and is to provide a vehicle headlight device that can suitably illuminate an area within which a vehicle equipped with the vehicle headlight device is stoppable, with a simple configuration.

The present disclosure achieves the purpose described above by the following solutions. An aspect of the present disclosure provides a vehicle headlight device that includes optical systems that are respectively provided to light sources to illuminate ahead of a vehicle by light emitted from the light sources, with light distribution patterns of which illuminating areas are offset to each other at least in vertical directions, a stoppable distance calculator that calculates a stoppable distance of the vehicle, and a light source controller that controls the light sources to be turned on and off so that an area ahead of the vehicle and away from the vehicle by the stoppable distance is illuminated based on at least one of the optical systems.

The light source controller may turn off or reduce intensities of the light sources other than the light source corresponding to the at least one of the optical systems.

The vehicle headlight device may further include a risk object detector that detects the existence of a risk object ahead of the vehicle, and a relative position of the risk object with respect to the vehicle. The light source controller may control the light sources to be turned on and off so that the risk object is illuminated by the at least one of the optical systems when the risk object detector detects the risk object.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

The present disclosure achieves the purpose to provide the vehicle headlight device which can suitably illuminates the area within which the vehicle is stoppable, with the simple configuration, by turning on and off respective light sources so that at least one of high beam, low beam, and fog lamps illuminate(s) an area near a stoppable distance calculated based on a vehicle speed and an estimated $\mu$ of a road surface.

Implementation

Hereinafter, one implementation of the vehicle headlight device to which the present disclosure is applied (hereinafter, referred to as "the headlight device") will be described. The headlight device of the implementation is mounted to a vehicle (hereinafter, referred to as "the vehicle"), such as an automobile or a passenger car, and illuminates ahead of the vehicle to secure a field of view of an operator of the vehicle when the vehicle travels in the dark. The phrase "traveling in the dark" as used herein includes traveling at night or traveling in a tunnel, etc.

Figure 1:
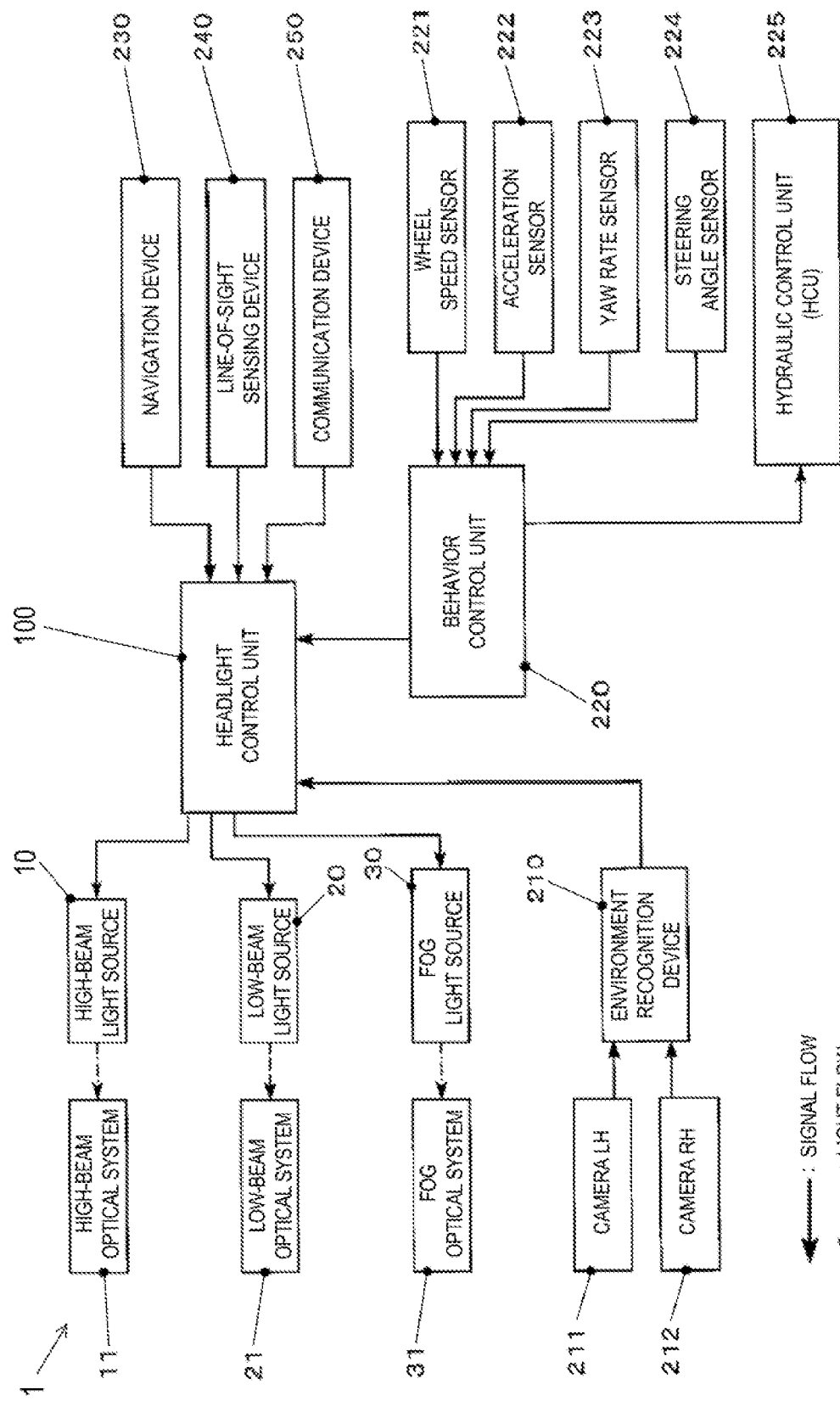
FIG. 1 is a block diagram schematically illustrating a configuration of one implementation of a vehicle headlight device to which the present disclosure is applied.

FIG. 1 is a block diagram schematically illustrating a configuration of the headlight device of the implementation. As illustrated in FIG. 1, the headlight device 1 is comprised of a high-beam light source 10, a high-beam optical system 11, a low-beam light source 20, a low-beam optical system 21, a fog light source 30, a fog optical system 31, and a headlight control unit 100. Note that, for example, any number of the headlight devices 1 may be provided, and in this implementation, one pair of the headlight devices 1 are provided so as to be separated from each other in vehicle width directions in a front end part of a vehicle body. Note that the high-beam optical system 11, the low-beam optical system 21, and the fog optical system 31 may function as an optical system in one implementation.

Each of the high-beam light source 10, the low-beam light source 20, and the fog light source 30 has, for example, a light source such as a high-intensity discharge bulb, a halogen bulb and a light-emitting diode (LED), and a power unit which supplies power to the light source. The high-beam light source 10, the low-beam light source 20, and the fog light source 30 are switchable of on and off of the light source independently from each other. Further, the high-beam light source 10, the low-beam light source 20, and the fog light source 30 can change their quantities of light when they are lit, by a plurality of steps or steplessly. The high-beam optical system 11, the low-beam optical system 21, and the fog optical system 31 illuminate ahead of a vehicle V by the high-beam light source 10, the low-beam light source 20, and the fog light source 30 with a predetermined light distribution pattern, respectively.

Figure 2:
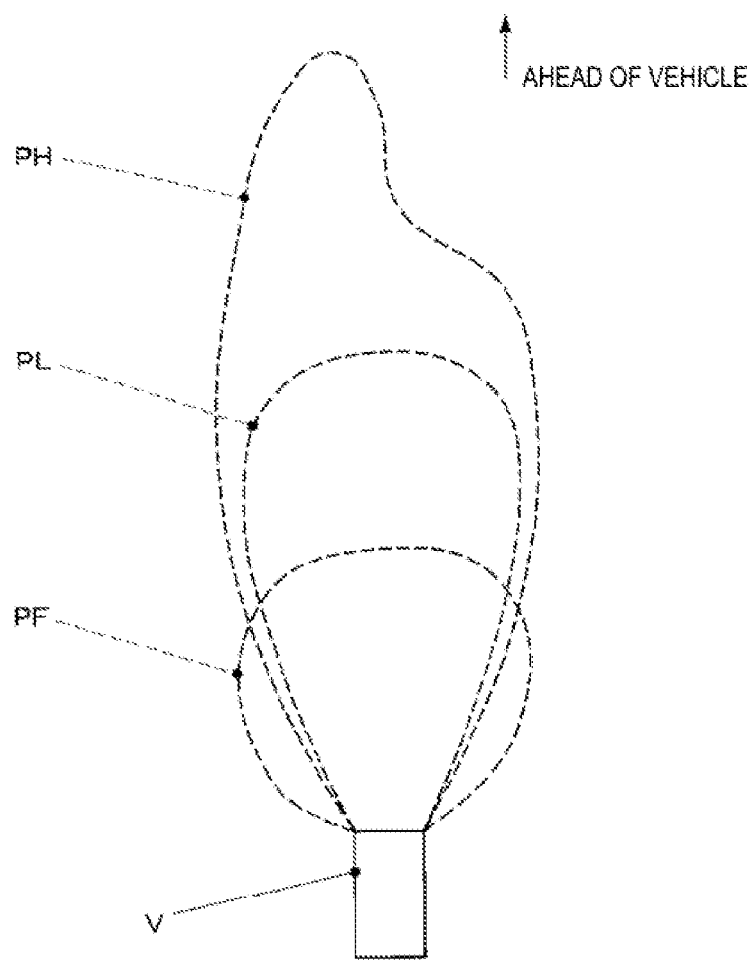
FIG. 2 is a view illustrating one example of a light distribution pattern of the vehicle headlight device of the implementation.

FIG. 2 is a view illustrating one example of the light distribution pattern of the vehicle headlight device of the implementation. The high-beam optical system 11, the low-beam optical system 21, and the fog optical system 31 form a high-beam light distribution pattern PH, a low-beam light distribution pattern PL, and a fog light distribution pattern PF, respectively. As illustrated in FIG. 2, a reachable distance of the illuminating light from the vehicle V becomes longer in the order of the high-beam light distribution pattern PH, the low-beam light distribution pattern PL, and the fog light distribution pattern PF.

The headlight control unit 100 totally controls turning on and off of the light sources described above, and their intensities (quantities of light) when the light sources are lit. The headlight control unit 100 is comprised of information processor(s) such as CPU(s), memory or memories such as RAM(s) and/or ROM(s), input/output interface(s), and a bus which connects these components. The headlight control unit 100 may function as a light source controller in one implementation. The control of the headlight control unit 100 will be described later in detail.

The headlight control unit 100 is directly connected with an environment recognition device 210, a behavior control unit 220, a navigation device 230, a line-of-sight sensing device 240, a communication device 250, etc., or indirectly connected, for example, via an on-board LAN system such as a CAN communication system. Note that the environment recognition device may function as a risk object detector in one implementation.

The environment recognition device 210 recognizes the shape of a lane where the vehicle is traveling, and relative positions of various objects which exist ahead of the vehicle with respect to the vehicle, for example, based on images which are obtained by imaging ahead of the vehicle. The environment recognition device 210 is provided with a stereo camera system which is comprised of a camera LH 211 and a camera RH 212. The camera LH 211 and the camera RH 212 image ahead of the vehicle at a predetermined angle of view, for example, by solid state image pickup devices, such as CMOSs or CCDs, and an optical system, such as lenses, provided at the incident side of the image pickup devices, respectively. Each of the camera LH 211 and the camera RH 212 acquires an image sequentially at a predetermined frame rate, and transmits the image to the environment recognition device 210. The camera LH 211 and the camera RH 212 are installed, for example, on a top end part of the windshield, inside the cabin so as to be separated from each other in the vehicle width directions. The environment recognition device 210 utilizes a parallax of the cameras to be detectable of the relative positions of the photographic objects with respect to the vehicle by performing a known stereo image processing of the images from the camera LH 211 and the camera RH 212.

The behavior control unit 220 controls fluid pressures supplied to wheel cylinders of fluid-operated service brakes of the vehicle to perform, for example, an anti-lock brake control which prevents wheel locks at the time of braking, and a vehicle behavior control which controls behaviors, such as understeering and oversteering.

The behavior control unit 220 is connected with wheel speed sensors 221, an acceleration sensor 222, a yaw rate sensor 223, and a steering angle sensor 224, and is inputted with outputs from these sensors. Further, the behavior control unit 220 outputs a control command to a hydraulic control unit (HCU) 225.

The wheel speed sensor 221 is provided to a hub part of each wheel (left and right front wheels and left and right rear wheels), and outputs a traveling speed pulse signal which changes in frequency in proportion to a rotating speed of the corresponding wheel. The behavior control unit 220 can calculate the rotating speed of each wheel (substantially corresponding to the traveling speed of the vehicle when a slip ratio is minute) based on the interval of the traveling speed pulse signals. The acceleration sensor 222 detects accelerations which act on the vehicle body in the longitudinal directions and the vehicle width directions. The yaw rate sensor 223 detects a rotating speed of the vehicle body in yaw directions (about the vertical axis). The steering angle sensor 224 detects a steering angle of a steering system of the vehicle. The HCU 225 is comprised of a pump which pressurizes brake fluid, and a solenoid valve which supplies the obtained fluid pressure to the wheel cylinder of the corresponding wheel. The HCU 225 supplies a predetermined fluid pressure to the corresponding wheel cylinder to control the braking force of the corresponding wheel.

The behavior control unit 220 performs the anti-lock brake control which periodically reduces the wheel cylinder fluid pressure of the wheel concerned to reduce the braking force so that the wheel is resumed back to a rotating state based on the output from each sensor when the wheel lock at the time of braking is detected. Further, the behavior control unit 220 performs the behavior control which generates a moment in a direction which reduces the behavior using a difference of the left and right wheel braking forces when the oversteering or understeering behavior of the vehicle is detected.

Further, the behavior control unit 220 has a road surface friction coefficient estimating function to estimate a friction coefficient (0 of a road surface where the vehicle is traveling. For example, the behavior control unit 220 can calculate the estimated μ of the road surface based on the traveling speed and the steering angle, and based on a difference between a yaw rate which is estimated from a predetermined model of the vehicle and an actual yaw rate. Further, the behavior control unit 220 can calculate a stoppable distance which is a minimum distance at which the vehicle can stop safely with a deceleration caused by braking, based on the estimated μ and the traveling speed. The behavior control unit 220 may function as a stoppable distance calculator in one implementation.

The navigation device 230 has memory or memories, such as HDD(s), in which map data containing information about road shapes etc. is stored, and a vehicle position measurer, such as a GPS system.

The line-of-sight sensing device 240 is provided, for example, to an instrument panel, and has an imager which images the operator, and an image processor which extracts the contour image of the operator's pupils by carrying out image processing of the image obtained by the imager to detect a line of sight of the operator.

The communication device 250 is connected with a communication network, such as the Internet, and acquires varieties of information, such as weather information.

Figure 3:
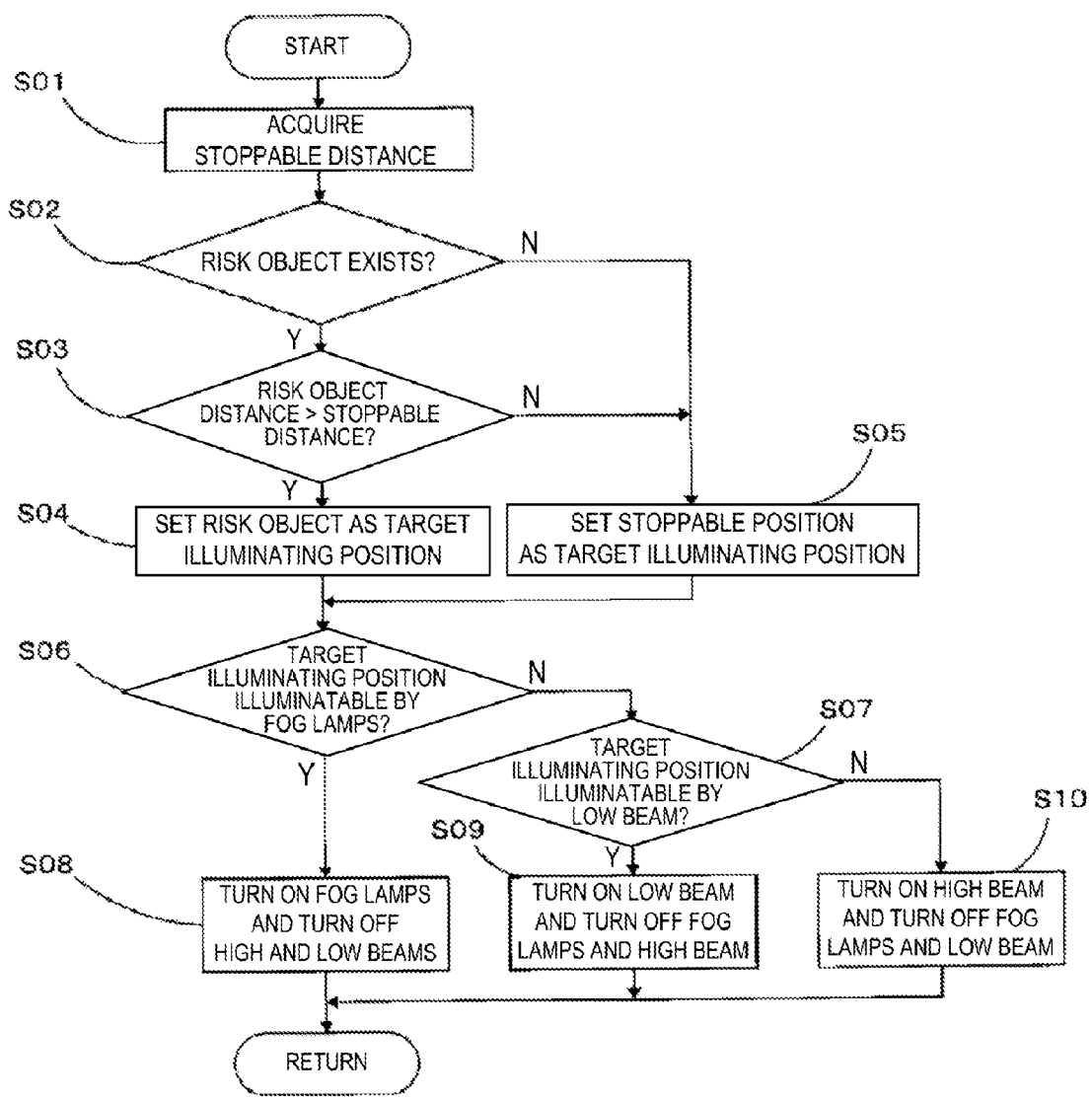
FIG. 3 is a flowchart illustrating a control of the vehicle headlight device of the implementation.

Next, a control of the headlight control unit 100 in the headlight device of the implementation will be described. FIG. 3 is a flowchart illustrating the control of the headlight control unit of the implementation. Hereinafter, the flowchart is described for every step in the order thereof.

<Step S01: Acquisition of Stoppable Distance> The headlight control unit 100 acquires information on the stoppable distance from the behavior control unit 220 based on the current vehicle speed and the road surface state. The headlight control unit 100 then transits to Step S02.

<Step S02: Existence Determination of Risk Object> The headlight control unit 100 determines whether there is a risk object ahead of the vehicle based on the output from the environment recognition device 210. The risk object includes an obstruction, a stopping vehicle (i.e., another vehicle), a pedestrian, a bicycle, and a dropped object on the road surface, for example. If the environment recognition device 210 detects the risk object, the headlight control unit 100 transits to Step S03, and, on the other hand, if the risk object is not detected, the headlight control unit 100 transits to Step S05.

<Step S03: Comparison of Risk Object Distance and Stoppable Distance> The headlight control unit 100 compares a distance to the risk object (risk object distance) acquired from the environment recognition device 210, with the stoppable distance acquired from the behavior control unit 220. If the risk object distance is longer than the stoppable distance, the headlight control unit 100 transits to Step S04, or otherwise, the headlight control unit 100 transits to Step S05.

<Step S04: Setting Risk Object Distance as Target Illuminating Position> The headlight control unit 100 sets the risk object detected by the environment recognition device 210 as a target illuminating position which is a position to be illuminated by the headlights. The headlight control unit 100 acquires a relative position (by direction and distance) of the risk object with respect to the vehicle from the environment recognition device 210. The headlight control unit 100 then transits to Step S06.

<Step S05: Setting Stoppable Position as Target Illuminating Position> The headlight control unit 100 sets a position which is on the lane where the vehicle is traveling (vehicle traveling lane) and is away from the vehicle by the stoppable distance along the vehicle traveling lane, as a stoppable position, and then sets the stoppable position as a target illuminating position which is a position to be illuminated by the headlight. The shape of the vehicle traveling lane can be acquired from the environment recognition device 210 and the navigation device 230, for example. The headlight control unit 100 then transits to Step S06.

<Step S06: Determination of Fog Illuminatability> The headlight control unit 100 determines whether the target illuminating position set at Step S05 or S06 is within the fog light distribution pattern PF. If the target illuminating position is within the fog light distribution pattern PF, the headlight control unit 100 transits to Step S08 because the illumination by the fog optical system 31 is considered as possible, or otherwise, the headlight control unit 100 transits to Step S07.

<Step S07: Determination of Low Beam Illuminatability> The headlight control unit 100 determines whether the target illuminating position set at Step S05 or S06 is within the low-beam light distribution pattern PL. If the target illuminating position is within the low-beam light distribution pattern PL, the headlight control unit 100 transits to Step S09 because the illumination by the low-beam optical system 21 is considered as possible, or otherwise, the headlight control unit 100 transits to Step S10 because the illumination by the high-beam optical system 11 is considered as required.

<Step S08: Turning-on of Fog Lamp and Turning-off of High Beam and Low Beam> The headlight control unit 100 turns on the fog light source 30 while turning off the high-beam light source 10 and the low-beam light source 20. Then, the headlight control unit 100 returns to Step S01 and repeats the series of processings described above.

<Step S09: Turning-on of Low Beam and Turning-off of High Beam and Fog Lamp> The headlight control unit 100 turns on the low-beam light source 20 while turning off the high-beam light source 10 and the fog light source 30. Then, the headlight control unit 100 returns to Step S01 and repeats the series of processings described above.

<Step S10: Turning-on of High Beam and Turning-off of Low Beam and Fog Lamp> The headlight control unit 100 turns on the high-beam light source 10 while turning off the low-beam light source 20 and the fog light source 30. Then, the headlight control unit 100 returns to Step S01 and repeats the series of processings described above.

As described above, according to the implementation, the target illuminating position can be suitably illuminated with the simple device configuration without using lighting systems having pivotable optical axes, by switching the high beam, the low beam, and the fog lamp so that the target illuminating position set according to the stoppable distance and the risk object is within the corresponding light distribution pattern.

MODIFICATIONS

The present disclosure may be modified and/or changed in various ways without being limited to the implementation described above, and those modifications and changes are still deemed to be within the technical scope of the present disclosure.

(1) The configuration of the headlight device may be suitably changed without being limited to the implementation described above. For example, the types and numbers of the light sources and optical systems, as well as the approaches of changing the intensities and illuminating areas may be suitably changed.

(2) The configurations of the sensors, the various devices, and the units which are connected with the headlight control unit in order to acquire the variety of information can be suitably changed.

(3) Although the high beam, the low beam, and the fog lamps are switched according to the stoppable distance etc. in the implementation described above, only the high beam and the low beam may be switched, for example. Further, four or more types of lighting systems having different illuminating light reachable distances may be switched.

(4) In the above implementation, only the light source which is selected to illuminate near the target illuminating distance is turned on, and other light sources are turned off; however, alternatively, the intensities (quantities of light) of the other light sources may be reduced.

(5) The risk object is detected by the stereo camera in the implementation described above; however, the risk object may be detected by other approaches using, for example, a millimeter wave radar, a laser radar, and a combination of these radars with a monocular camera or the stereo camera, without any limitations.

The invention claimed is:

1. A vehicle headlight device, comprising:
   a plurality of optical systems that are respectively provided to a plurality of light sources to illuminate ahead of a vehicle by light emitted from the plurality of light sources, where light distribution patterns of the plurality of optical systems have illuminating areas which have a fixed offset to each other at least in vertical directions;
   a stoppable distance calculator that calculates a stoppable distance of the vehicle; and
   a light source controller that controls the light sources to be turned on and off so that an area ahead of the vehicle and away from the vehicle by the stoppable distance is illuminated based on at least one of the optical systems.

2. The vehicle headlight device of claim 1, wherein the light source controller turns off or reduces intensities of the light sources other than the light source corresponding to the at least one of the optical systems illuminating the area ahead of the vehicle and away from the vehicle by the stoppable distance.

3. The vehicle headlight device of claim 1, further comprising a risk object detector that detects the existence of a risk object ahead of the vehicle, and a relative position of the risk object with respect to the vehicle,
   wherein the light source controller controls the light sources to be turned on and off so that the risk object is illuminated by the at least one of the optical systems when the risk object detector detects the risk object.

4. The vehicle headlight device of claim 2, further comprising a risk object detector that detects the existence of a risk object ahead of the vehicle, and a relative position of the risk object with respect to the vehicle,
   wherein the light source controller controls the light sources to be turned on and off so that the risk object is illuminated by the at least one of the optical systems when the risk object detector detects the risk object.

* * * * *